June 10, 1930.  F. C. VANDERGRIFT  1,762,368
EXTRUSION APPARATUS
Filed Sept. 8, 1928
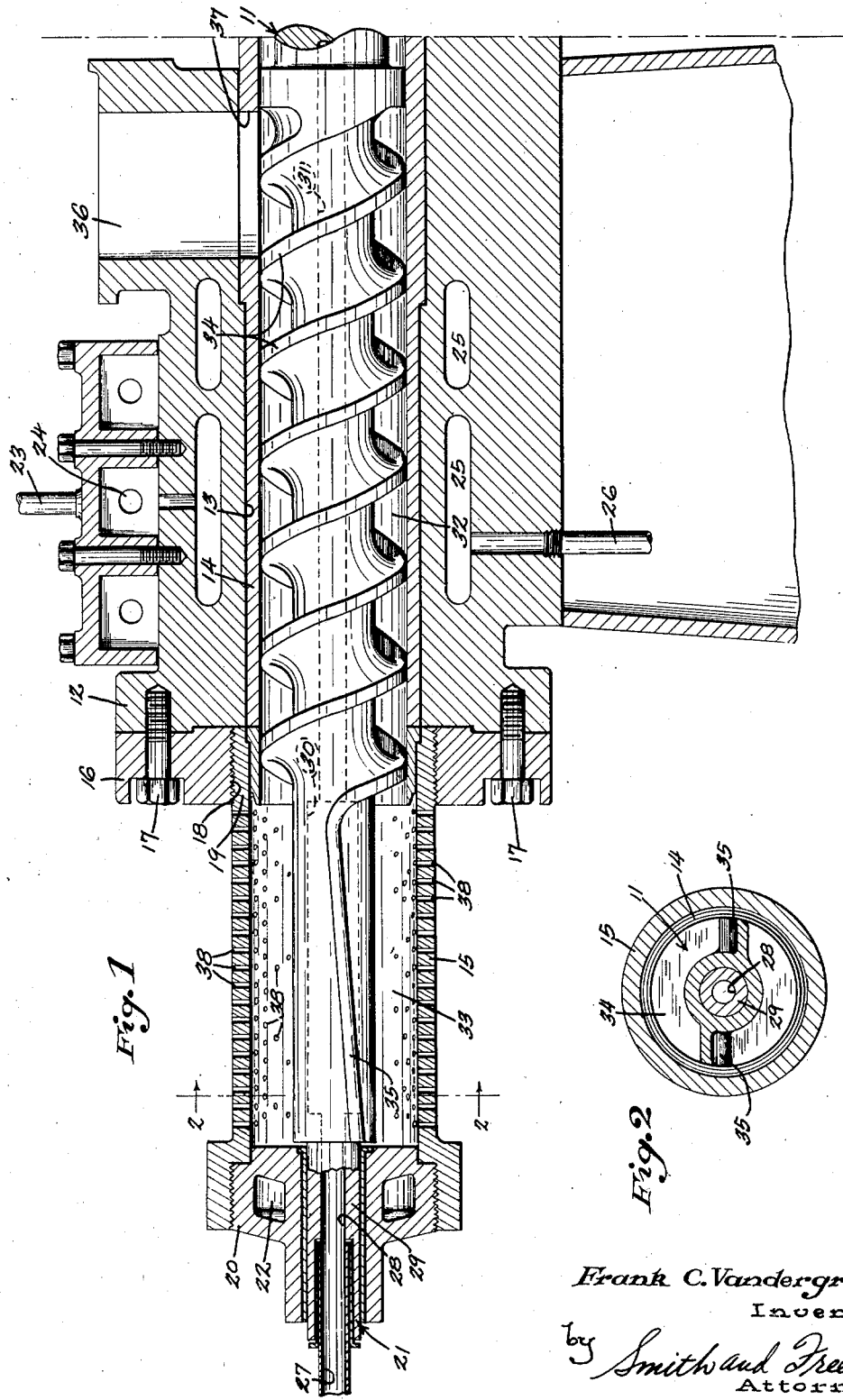
Frank C. Vandergrift
Inventor
by Smith and Freeman
Attorneys Patented June 10, 1930

1,762,368

UNITED STATES PATENT OFFICE

FRANK C. VANDERGRIFT, OF AKRON, OHIO, ASSIGNOR, BY MESNE ASSIGNMENTS, TO NATIONAL-ERIE COMPANY, OF ERIE, PENNSYLVANIA, A CORPORATION OF PENNSYLVANIA

EXTRUSION APPARATUS

Application filed September 8, 1928. Serial No. 304,730.

My invention relates to extrusion apparatus, and particularly to apparatus of this type peculiarly adapted for straining either crude or reclaimed rubber, and the principal object of my invention is to provide new and improved apparatus of this type particularly adapted for this use. In the drawings accompanying this specification and forming a part of this application I have shown, for purposes of illustration, one form which my invention may assume, and in these drawings:

Figure 1 is a central vertical longitudinal section of the embodiment of my invention herein shown, while Figure 2 is a section taken on the line 2—2 of Figure 1.

My present invention is an improvement on my copending application Serial Number 242,646 filed December 27, 1927, and portions of the apparatus, omitted herein, are shown therein.

A casing 12 is provided with a bore 13 in which is mounted a sleeve 14, and a strainer shell 15 mounted on the end of the casing 12 is held in position by means of an annular plate 16 which is secured to the end of the casing 12 by machine screws 17 and is provided with a central screw threaded bore 18 screw-threadedly receiving the externally screw threaded end 19 of the shell 15. Closing the outer end of the shell 15 is an end cap 20 provided with an annular cooling-water chamber 22, and interiorly thereof with a bearing 21 for supporting the outer end of a screw 11 propelled by any one of several suitable operating means each well known in the art and not described herein since the operating means forms no part of my present invention.

The casing 12 is cooled by cooling water entering from an inlet duct 23 through an inlet distributor 24 into annular passages 25 surrounding the bore 13 of the casing 12 and from which the cooling water discharges through a waste duct 26, and the screw 11 is cooled by cooling water flowing from a duct 27 into the end of a bore 28 in the extension 29 of the screw 11 which leads to a cooling-water chamber 30 in the forward portion of the screw 11 from which the water is discharged through a duct 31 passing through the rear portion of the screw 11.

The sleeve 14 and the shell 15 form a screw chamber comprising a section 32 of reduced diameter within the sleeve 14 and a section 33 of greater diameter within the shell 15, the part of the screw 11 lying within the screw chamber section 32 is provided with threads 34 of relatively low pitch tending to force the material toward the end cap 20, while the part of the screw 11 lying within the screw chamber section 33 is provided with a reverse thread 35 of relative high pitch tending to force the material away from the end cap 20 and toward the shell 15 thereby relieving the end cap 20 of the excessive strain to which it otherwise would be subjected and as a consequence lowering the temperature of the processed material at that critical point.

The material is fed into the screw chamber through a hopper 36 formed on the casing 12 at the rear end of the screw chamber section 32 by means of an opening 37 formed in the sleeve 14, and the material is forced from the screw chamber 32 into the screw chamber 33 where it is then forced through a multiplicity of openings 38 provided in the lateral wall of the shell 15, the material being fed forward from the screw casing 32 into the screw casing 33 by the rear portion of the screw 11 provided with threads 34 of relatively low pitch and then retarded and forced outwardly through the apertures 38 by the forward portion of the screw 11.

It will be apparent to one skilled in the art that the apertures 38 may be of any desired size, also that a screen of desired size may over-lie the apertures 38, as shown in my said copending application Serial Number 242,646, and that no material larger than one of the apertures 38, or than the mesh of such screen, can pass through the apertures 38 from the screw chamber section 33, and accordingly that the passage of the rubber through the mechanism above described will remove from the rubber all foreign material of a size larger than the size of one of the apertures 38, or of the mesh of such screen.

It also will be apparent to one skilled in the art that the material fed into the hopper will be forced by the screw 11 generally toward the end cap 20, and that there will be created against the end cap 20 a great pressure. It will further be apparent that the reverse pitch on that part of the screw 11 lying within the screw casing 33 will tend to relieve the pressure of the material against the end cap 20 by retarding and diverting the material away from said end cap thereby reducing the pressure and temperature of the material at that point.

From the above description it will be apparent to one skilled in the art that the embodiment of my invention herein disclosed provides a new and improved extrusion apparatus particularly suitable for straining crude and reclaimed rubber. At the same time one skilled in the art also will appreciate that the embodiment of my invention herein shown and described may be used for other purposes than those specifically pointed out or suggested herein, and embodies advantages other than those specifically pointed out or suggested herein, and also that this particular embodiment of my invention herein disclosed may be variously changed and modified without departing from the spirit of my invention or sacrificing the advantages thereof, wherefore it will be understood that the disclosure herein is illustrative only, and that my invention is not limited thereto.

I claim:

1. Extrusion mechanism, as for straining rubber, comprising: a screw chamber casing provided at its rear portion with an inlet opening for the introduction of material into said chamber, and at its forward portion with a lateral outlet for the egress of such material from said chamber, and with closure means closing the forward end of said chamber; and a screw unit, mounted within said chamber, provided with a screw at said inlet end of said chamber to force said material toward said closure means upon rotation of said screw unit, and provided at said forward end with means tending to hold said material away from said closure means and to force said material through said lateral outlet.

2. Extrusion mechanism as for straining rubber, comprising: a screw chamber casing provided at its rear portion with an inlet opening for the introduction of material into said chamber, and at its forward portion with a strainer outlet for the egress of such material from said chamber, and with closure means closing the forward end of said chamber; and a screw unit mounted within said chamber, provided with a screw at said inlet end of said chamber to force said material toward said closure means upon rotation of said screw unit, and provided at said forward end with a screw of extremely high pitch tending to hold said material away from said closure means and to force said material through said lateral outlet.

3. Extrusion mechanism, as for straining rubber, comprising: a screw chamber casing provided at its rear portion with an inlet opening for the introduction of material into said chamber, and at its forward portion with a lateral outlet for the egresss of such material from said chamber, and with closure means closing the forward end of said chamber; and a screw unit, mounted within said chamber, provided with a screw at said inlet end of said chamber to force said material toward said closure means upon rotation of said screw unit, and provided at said forward end with a reverse screw of extremely high pitch tending to force said material away from said closure means and through said lateral outlet.

4. Extrusion mechanism, as for straining rubber, comprising: a screw chamber casing provided at its rear portion with an inlet opening for the introduction of material into said chamber, and at its forward portion with a cylindrical lateral strainer outlet for the egress of such material from said chamber, and with closure means closing the forward end of said chamber; and a screw unit, mounted within said chamber, provided with a screw at said inlet end of said chamber to force said material toward said closure means upon rotation of said screw unit, and provided at said forward end with means tending to hold said material away from said closure means and to force said material through said cylindrical lateral outlet.

5. Extrusion mechanism, as for straining rubber, comprising: a screw chamber casing provided at its rear portion with an inlet opening for the introduction of material into said chamber, and at its forward portion with a cylindrical lateral strainer outlet for the egress of such material from said chamber, and with closure means closing the forward end of said chamber; and a screw unit, mounted within said chamber, provided with a screw at said inlet end of said chamber to force said material toward said closure means upon rotation of said screw unit, and provided at said forward end with a screw of extremely high pitch tending to hold said material away from said closure means and to force said material through said cylindrical lateral outlet.

6. Extrusion mechanism, as for straining rubber, comprising: a screw chamber casing provided at its rear portion with an inlet opening for the introduction of material into said chamber, and at its forward portion with a cylindrical lateral strainer outlet for the egress of such material from said chamber, and with closure means closing the forward end of said chamber; and a screw unit, mounted within said chamber, provided with a screw at said inlet end of said chamber to force said material toward said closure means upon rotation of said screw unit, and provided at said forward end with a reverse screw of extremely high pitch tending to force said material away from said closure means and through said cylindrical lateral outlet.

In testimony whereof I hereunto affix my signature.

FRANK C. VANDERGRIFT.